March 2, 1926.
B. BOYKIN, JR
1,574,865
PIPE TONGS FOR ROTARIES
Filed March 9, 1925
2 Sheets-Sheet 1
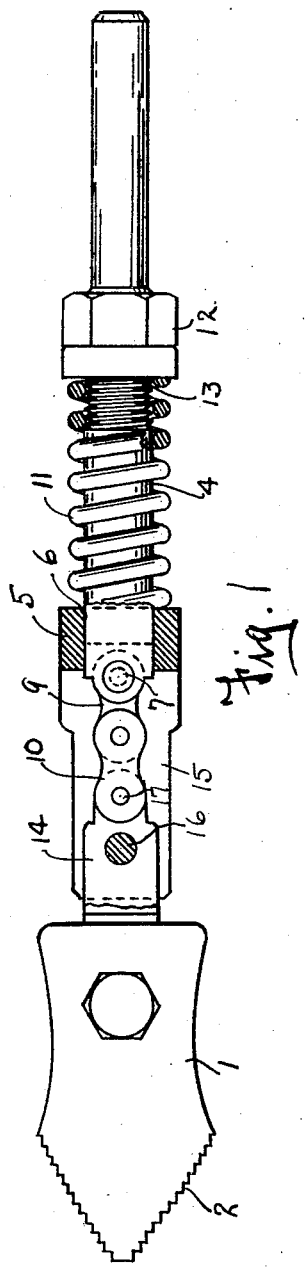
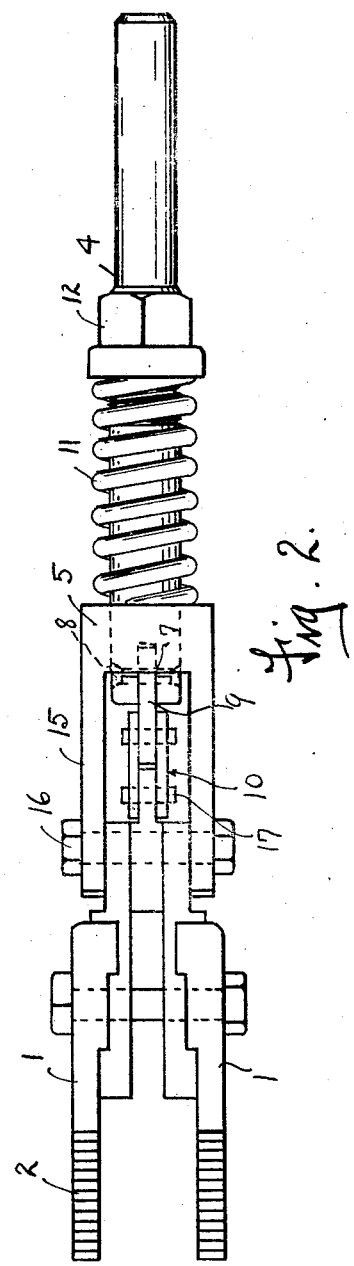
Burwell Boykin Jr. Inventor
By Jesse R. Stone
Attorney March 2, 1926.  
B. BOYKIN, JR  
1,574,865  
PIPE TONGS FOR ROTARIES  
Filed March 9, 1925  2 Sheets-Sheet 2
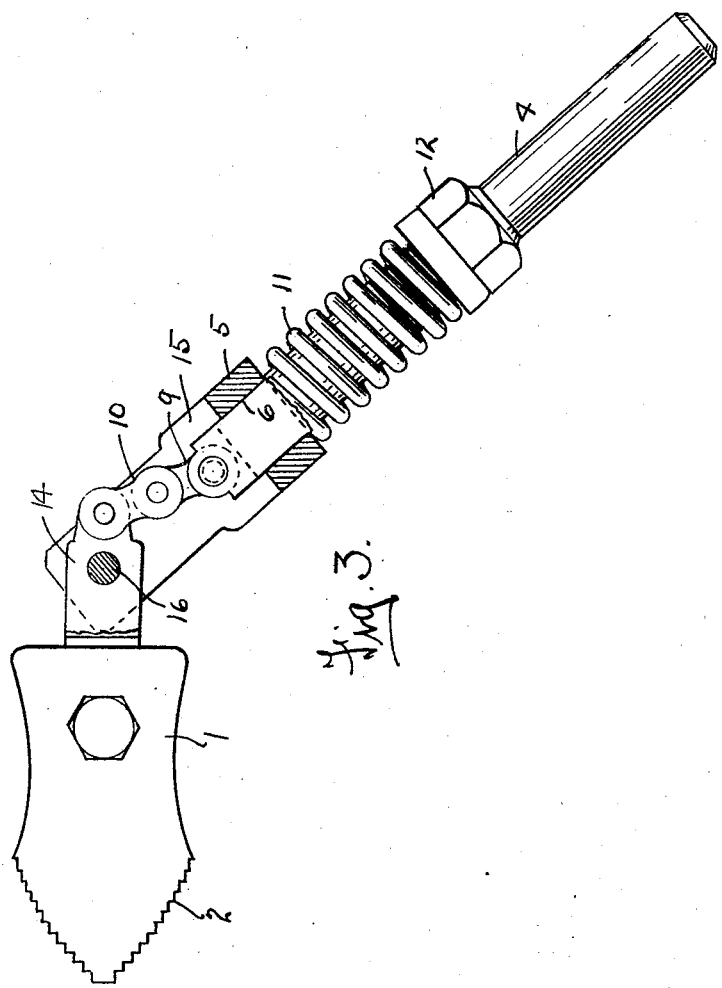
Burwell Boykin, Jr. Inventor
By Jesse R. Stone Attorney Patented Mar. 2, 1926.

1,574,865

UNITED STATES PATENT OFFICE.

BURWELL BOYKIN, JR., OF BEAUMONT, TEXAS.

PIPE TONGS FOR ROTARIES.

Application filed March 9, 1925. Serial No. 14,114.

*To all whom it may concern:*

Be it known that I, BURWELL BOYKIN, Jr., a citizen of the United States, residing at Beaumont, Jefferson County, Texas, have invented a certain new and useful Improvement in Pipe Tongs for Rotaries, of which the following is a specification.

My invention relates to pipe tongs for use on rotaries in screwing up or unscrewing pipe joints by use of the rotary table.

It is now customary in rotary drilling, to use the rotary to unscrew or screw up the pipe joints. In doing this the pipe tongs are secured upon the joint to be turned and the outer end of the handle of the tongs bears against a post which may be secured in the outer rotary table in double table rotaries. In screwing up the joints it is desirable that the joints be not threaded together too tightly; for the threads on the joints may be mutilated and the joint may be "frozen" so that it cannot be easily unscrewed.

It is an object of my invention to provide a pipe wrench or tongs which will yield under a predetermined pressure, thus preventing injury to the joint to which it is secured.

It is also desired that the device be capable of application to various makes of tongs now in general use.

Referring to the drawing herewith, Fig. 1 is a side elevation, partly in section, of a pipe wrench with my invention applied thereto. Fig. 2 is a similar view taken at right angles to that disclosed in Fig. 1. Fig. 3 is a view similar to that shown in Fig. 1 with the parts in different position. Like numerals of reference are applied to like parts in all the views.

In the drawings my invention is shown as applied to an ordinary type of chain tongs, but it is to be understood that the invention lies principally in the construction of the handle, and may be applied to any ordinary type of make-up tongs employed in screwing up joints in pipe. The head of the tongs shown in the drawing is made up of two side plates 1 which are shaped somewhat like a spear head with the rounded tapering sides toothed at 2 to engage against a pipe. A chain, not shown is employed to secure the said toothed portion in engagement with the pipe being rotated.

The handle is a jointed one held resiliently in operative position. It comprises a bar or shaft 4 approximately cylindrical in shape and the forward end is adapted to be slidably received within a collar 5 having an opening 6 to receive the shaft. The end of the handle shaft 4 is formed with a transverse opening 7 to receive a rivet or pin 8 by means of which it is pivotally connected to a link 9 of a chain 10.

The collar 5 is held resiliently in position at the forward end of the handle shaft 4 by means of a coiled compression spring 11, fitting on said shaft and bearing at one end upon the collar 5 and at its other end upon a nut 12 adjustably threaded at 13 upon the shaft.

The head 1 of the tongs has a longitudinally extending flattened shank 14 thereon which is secured to two side plates 15 connected rigidly to the collar 5, and preferably formed integrally thereon. The pin 16 connecting the plates 15 to the shank 14 forms a pivot upon which said handle may swing against the tension of the spring 11.

The chain 10, previously referred to, is connected at its forward end to the shank 14 at the point 17 and acts to retain the end of the shaft 4 flexibly to the shank of the head 1.

In operating the said tongs the head 1 is secured to the joint to be tightened and the handle 4 is secured behind a post which acts as a stop to prevent rotation of the tongs relative to the joint. Where a double table rotary is used, the post may be on an outer ring-shaped table rotatable independently of the central table in which the pipe is secured. The rotation of the outer table will then swing the tongs about the pipe carrying with it the collar or tool joint which is to be tightened. The pressure of the spring 11 is adjusted to prevent the handle from breaking at the joint 16 under a predetermined pressure. When this pressure is exceeded, however, as when the joint is screwed up tightly, the resistance of the joint will overcome the pressure of the spring 11 and the handle will swing on pivot 16 into a position at an angle to the head as shown in Fig. 3, thus swinging it free of the post and releasing the strain on the joint which has been sufficiently tightened. The "breaking" of the handle causes the handle-shaft to be drawn through the collar 5 as shown in Fig. 3, thus further compressing spring 11, which thus tends to draw the handle back into extended position as before, after the handle is free of the post. The wrench will be thus freed from the pipe and will drop to the derrick platform, and may thereafter be applied to the next joint to be tightened in a similar manner.

The use of this type of tongs will enable the driller to work rapidly, and at the same time safely, in screwing up the pipe. The tongs may be easily attached and operated without danger of accidental straining or mutilation of the pipe, or the tools.

While I have shown the preferred embodiment of my invention, I wish it understood that various changes in arrangement of parts and the employment of equivalents may be employed without departing from the spirit of my invention.

Having thus described my invention, what I claim as new and desire to protect by Letters Patent is:

1. In a pipe tongs for use on rotaries, a head, a shank thereon, a handle shaft, a chain connection between said shank and shaft, a collar slidable on said shaft, plates on said collar pivoted to said shank, and a spring on said handle shaft acting to force said collar toward said head.

2. In a pipe tongs for use on rotaries, a pipe gripping head, a handle, a chain connecting said handle and head, a collar slidable on said handle, plates on said collar pivotally connected with said head, and a spring on said handle tending to resist movement of said collar on said handle toward its outer end.

3. In a pipe tongs for use on rotaries, a pipe gripping head, a shank thereon, a handle pivoted on the outer end of said shank to swing thereon, and a spring on said handle and surrounding the same and adapted to resiliently hold said handle extended in line axially of said head and shank with a predetermined force.

4. In a pipe tongs for use on rotaries, a pipe engaging head, a shank on said head, a collar secured pivotally to said shank adjacent said head, a handle slidable in said collar and secured flexibly to the outer end of said shank and a spring on said handle to hold said handle extended axially from said head with a predetermined force.

5. In a pipe tongs for use on rotaries, a pipe engaging head, a shank thereon, a handle having a jointed connection with the end of said shank, a compression spring on said handle, and tending to hold said handle extending axially from said head with a predetermined force, and means in which said handle is slidable between said spring and said head.

In testimony whereof I hereunto affix my signature this 5th day of March A. D. 1925.

BURWELL BOYKIN, Jr.